United States Patent
Bishwas

(10) Patent No.: US 11,732,369 B2
(45) Date of Patent: Aug. 22, 2023

(54) ELECTRODE FOR AN ELECTROLYSIS PROCESS

(71) Applicant: HYMETH APS, Søborg (DK)

(72) Inventor: Sumon Bishwas, Brøndby Strand (DK)

(73) Assignee: HYMETH APS

(*) Notice: Subject to any disclaimer, the term of this patent is extended or adjusted under 35 U.S.C. 154(b) by 0 days.

(21) Appl. No.: 16/648,823

(22) PCT Filed: Sep. 19, 2018

(86) PCT No.: PCT/EP2018/075332
§ 371 (c)(1),
(2) Date: Mar. 19, 2020

(87) PCT Pub. No.: WO2019/057761
PCT Pub. Date: Mar. 28, 2019

(65) Prior Publication Data
US 2020/0216969 A1 Jul. 9, 2020

(30) Foreign Application Priority Data
Sep. 21, 2017 (EP) .................................... 17192439

(51) Int. Cl.
*C25B 11/057* (2021.01)
*C25B 11/02* (2021.01)
(Continued)

(52) U.S. Cl.
CPC .............. *C25B 11/057* (2021.01); *C25B 1/04* (2013.01); *C25B 9/70* (2021.01); *C25B 9/73* (2021.01); *C25B 11/02* (2013.01)

(58) Field of Classification Search
CPC .. C25B 11/02; C25B 9/73; C25B 1/04; C25B 11/057; C25B 11/075; C25B 9/70
See application file for complete search history.

(56) References Cited

U.S. PATENT DOCUMENTS

| 622,689 A | * | 4/1899 | Howell | ................ | H01M 4/745 29/2 |
| 2,967,814 A | | 1/1961 | Tuwiner | | |

(Continued)

FOREIGN PATENT DOCUMENTS

| CN | 202131377 | 2/2012 |
| CN | 105980605 | 9/2016 |

(Continued)

OTHER PUBLICATIONS

Yoshikazu Ito, Masahiko Izumi, Daisuke Hojo, Mitsuru Wakisaka, Tsutomu Aida, and Tadafumi Adschiri, One-step Nanoporous Structure Formation Using NiO Nanoparticles: Pore Size Control and Pore Size Dependence of Hydrogen Evolution Reaction, Chemistry Letters 2017 46:2, 267-270, Dec. 10, 2016 (Year: 2016).*

(Continued)

*Primary Examiner* — Alexander W Keeling
*Assistant Examiner* — Mofoluwaso S Jebutu
(74) *Attorney, Agent, or Firm* — McAndrews, Held & Malloy, Ltd.

(57) ABSTRACT

An electrode including a metal coil and a metal wire is provided. The metal coil includes a metal selected from copper, silver, gold, nickel and aluminium. The turns of the metal coil are separated by a gap. At least part of the metal wire is arranged inside the metal coil. The metal wire and the metal coil are in electrical contact. The metal wire includes a metal selected from copper, silver, gold, nickel and aluminum. The metal wire and the metal coil are made of a same metal. The metal coil has a plurality of turns forming an elongated coil body with a central channel along a central axis of the metal coil. The metal wire extends longitudinally inside the central channel from one end of the metal coil to an other end of the metal coil along the central axis of the metal coil.

13 Claims, 5 Drawing Sheets

(51) Int. Cl.
*C25B 9/70* (2021.01)
*C25B 9/73* (2021.01)
*C25B 1/04* (2021.01)

(56) References Cited

U.S. PATENT DOCUMENTS

| | | | | |
|---|---|---|---|---|
| 4,007,054 | A | * | 2/1977 | Marincic .......... H01M 4/06 |
| | | | | 429/206 |
| 4,210,516 | A | * | 7/1980 | Mose .............. C25B 9/65 |
| | | | | 204/284 |
| 4,439,297 | A | * | 3/1984 | Kircher ............ C25B 9/19 |
| | | | | 204/263 |
| 4,693,797 | A | | 9/1987 | deNora |
| 4,725,347 | A | * | 2/1988 | Pimlott ............. C25B 9/73 |
| | | | | 204/254 |
| 5,919,344 | A | | 7/1999 | d'Erasmo et al. |
| 7,959,790 | B2 | | 6/2011 | Woytowich et al. |
| 8,236,149 | B2 | | 8/2012 | Wilson |
| 9,297,085 | B2 | | 3/2016 | Kitaori et al. |
| 2012/0241314 | A1 | | 9/2012 | Madono et al. |
| 2013/0299342 | A1 | | 11/2013 | Suemoto et al. |
| 2015/0122666 | A1 | | 5/2015 | Estrada |
| 2016/0164107 | A1 | | 6/2016 | Ionescu |
| 2017/0335474 | A1 | * | 11/2017 | Flechsig .......... C25B 11/02 |

FOREIGN PATENT DOCUMENTS

| | | |
|---|---|---|
| JP | 2006116519 | 5/2006 |
| JP | 5914670 | 4/2016 |

OTHER PUBLICATIONS

P&J Manufacturing Company, Twisted Metal Square Bar, TwistedBars.com, accessed Jan. 12, 2022 (Year: 2022).*
PCT International Search Report and Written Opinion for PCT Patent Application No. PCT/EP2018/075332, dated Dec. 6, 2018, 18 pages.
European Search Report for European Patent Application No. 17192439.2, dated Nov. 28, 2017, 7 pages.
Office Action for Chinese Patent Application No. 201880061473.9, dated Oct. 25, 2021, 6 pages.

* cited by examiner

ELECTRODE FOR AN ELECTROLYSIS PROCESS

CROSS-REFERENCE TO RELATED APPLICATIONS/INCORPORATION BY REFERENCE

The present application is the U.S. national phase under § 371 of International Application No. PCT/EP2018/075332, having an international filing date of Sep. 19, 2018, which claims priority to EP Patent Application No. 17192439.2, filed Sep. 21, 2017. Each of the above-mentioned prior-filed applications is hereby expressly incorporated herein by reference in its entirety.

TECHNICAL FIELD

The present disclosure relates to electrodes and in particular to electrodes for an electrolysis process.

BACKGROUND

Electrolysis of water is a process in which water molecules are decomposed, forming hydrogen gas and oxygen gas. This process occurs as a result of an electric current flowing between two electrodes submerged in water.

An electrolyte is typically added to the water prior to electrolysis to increase the electric conductance of the water. This ensures a more efficient electrolysis process due to the better charge carrying characteristics. Adding an electrolyte may however result in that undesired by-products are created during the electrolysis process.

Purified water may be used for the purpose of electrolysis, essentially eliminating the creation of undesired by-products. However, due to the inherent properties of purified water such as low electrical conductance, it may be more difficult to initiate an efficient electrolysis process in purified water.

SUMMARY

In view of the above, a general object of the present disclosure is to solve or at least reduce the problems of the prior art.

There is hence according to a first aspect of the present disclosure provided an electrode comprising a metal wire and a metal coil, wherein at least part of the metal wire is arranged inside the metal coil and wherein the metal wire and the metal coil are in electrical contact.

The metal wire and the metal coil form hence part of a single electrode.

The present electrode design with a metal coil and metal wire extending inside the metal coil along the longitudinal extension of the metal coil creates a magnetohydrodynamic effect, which reduces electrolytic polarization, increases the convection phenomenon, and increases the current density and the Lorentz force. The electrolysis process can thereby be made more efficient.

The resistivity of the metal used for the metal coil and the metal wire is preferably low. Thereby, a relatively strong magnetic effect is obtained and over-heating is avoided. If part of the current generates heat instead of electrolysis, the overall efficiency of the process is reduced. Further, heat may generate steam, which contaminates the hydrogen and oxygen gases to produced by the electrolysis. Examples of low-resistivity metals are silver, gold, aluminium, copper and nickel. After silver, copper is the metal of the lowest resistivity. Copper is therefore the most preferred metal as it is less expensive than silver and gold. Aluminium is unstable in alkaline solutions and therefore less suitable than copper in an electrode of the present disclosure.

Accordingly, the metal wire and the metal coil may comprise a metal selected from copper, silver, gold and aluminium. According to a preferred embodiment, the metal wire comprises copper and the metal coil comprises copper.

According to one embodiment the turns of the metal coil are separated by a gap. Hereto, the metal coil, which is helical, has such a pitch that there is a gap or distance between consecutive turns. This facilitates for liquid to flow into the core area of the metal coil, i.e. into the central channel formed by the turns of the metal coil.

According to one embodiment the electrode further comprises an electrically conducting frame to which the metal wire and the metal coil are connected.

The metal wire and the metal coil are electrically connected to the electrically conducting frame. The metal wire and the metal coil may in particular be galvanically connected to the electrically conducting frame.

The electrically conducting frame may according to one embodiment be covered, for example coated, with an insulating material. Thereby, adjacent electrodes in a stack may be insulated from each other. The insulating material may be hydrophobic to facilitate water flow through an electrolyser stack comprising the electrically conducting frame. An example of a suitable hydrophobic insulating material is Teflon®, e.g. Teflon® PFA.

According to one embodiment the electrically conducting frame is a metal frame.

According to one embodiment the electrically conducting frame comprises to copper.

According to one embodiment the metal wire and the metal coil forms a subunit and the electrode comprises at least two such subunits, such as at least three such subunits, such as at least four such subunits. The electrode may thus comprise a plurality of subunits.

According to one embodiment which comprises the electrically conducting frame, the subunits are connected to the electrically conducting frame. All subunits of an electrode can thus be electrically connected to the electrically conducting frame.

According to one embodiment the subunits extend longitudinally in the same plane.

According to one embodiment the subunits are parallel.

According to one embodiment the metal wire and the metal coil are covered with a nanoporous structure comprising nickel. The previously mentioned magnetohydrodynamic effect created by the configuration of the metal wire and the metal coil helps gas bubbles to escape the nanoporous structure.

The nanoporous structure increases the current density, thus making electrolysis more efficient.

According to one embodiment the metal wire and the metal coil are galvanically connected. The metal wire and the metal coil are hence mechanically connected to each other. Thus, when the electrode is connected to a power source, the metal wire and the metal coil will have the same electric potential.

According to one embodiment the metal coil has a plurality of turns forming an elongated coil body with a central channel along the central axis of the metal coil, wherein the metal wire extends longitudinally inside the central channel.

The metal wire may for example extend straight or essentially straight inside the central channel from one end of the metal coil to the other end of the metal coil. The metal wire may hence extend parallel with or essentially parallel with the central axis of the metal coil.

According to one embodiment, the metal wire extends through the entire coil. The metal wire may hence extend from one end of the metal coil to the other end of the metal coil along the central axis of the metal coil.

In alternative and less preferred, but still working, configurations of the above-mentioned embodiments of the first aspect, no metal wire is arranged inside the metal coil.

There is according to a second aspect of the present disclosure provided an electrolytic cell comprising two electrodes according the first aspect and a membrane configured to separate the two electrodes. Such a separation may comprise one or more gaskets. For example, the membrane may be fixed between two gaskets, which in turn contact the respective electrodes. Alternatively, the membrane may be integrated with a gasket arranged to contact the frames of the electrodes.

The pore size of the membrane may for example be 0.15±0.05 μm. An example of a suitable membrane material is Zirfon Perl 500 UTP.

There is according to a third aspect of the present disclosure provided an electrolyser stack comprising at least two electrolytic cells according to the second aspect.

The electrolyser stack may in particular comprise a plurality of electrolytic cells arranged aligned in a stacked manner. A fluid chamber is thus formed by the electrically conducting frames. The pairs of metal coils and metal frames extend between opposite sides of their respective electrically conducting frames. The fluid chamber thus includes the plurality of pairs of metal coils and metal frames, which span the fluid chamber.

The electrolyser stack may comprise a fluid inlet to allow a fluid such as water to enter the fluid chamber. The fluid can thereby contact the electrodes inside the fluid chamber so that an electrolysis process can be initiated. The electrolyser stack may furthermore comprise a first gas outlet and a second gas outlet. The first gas outlet and the second gas outlet may be configured to discharge/release a respective gas from the fluid chamber, obtained from the electrolysis processes. For example, in electrolysis of water hydrogen gas is created at the cathode and oxygen at the anode. Hereto, the first gas outlet may be configured to operate as a hydrogen gas outlet and the second gas outlet may be configured to operate as an oxygen gas outlet.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Examples of the inventive concept will now be described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
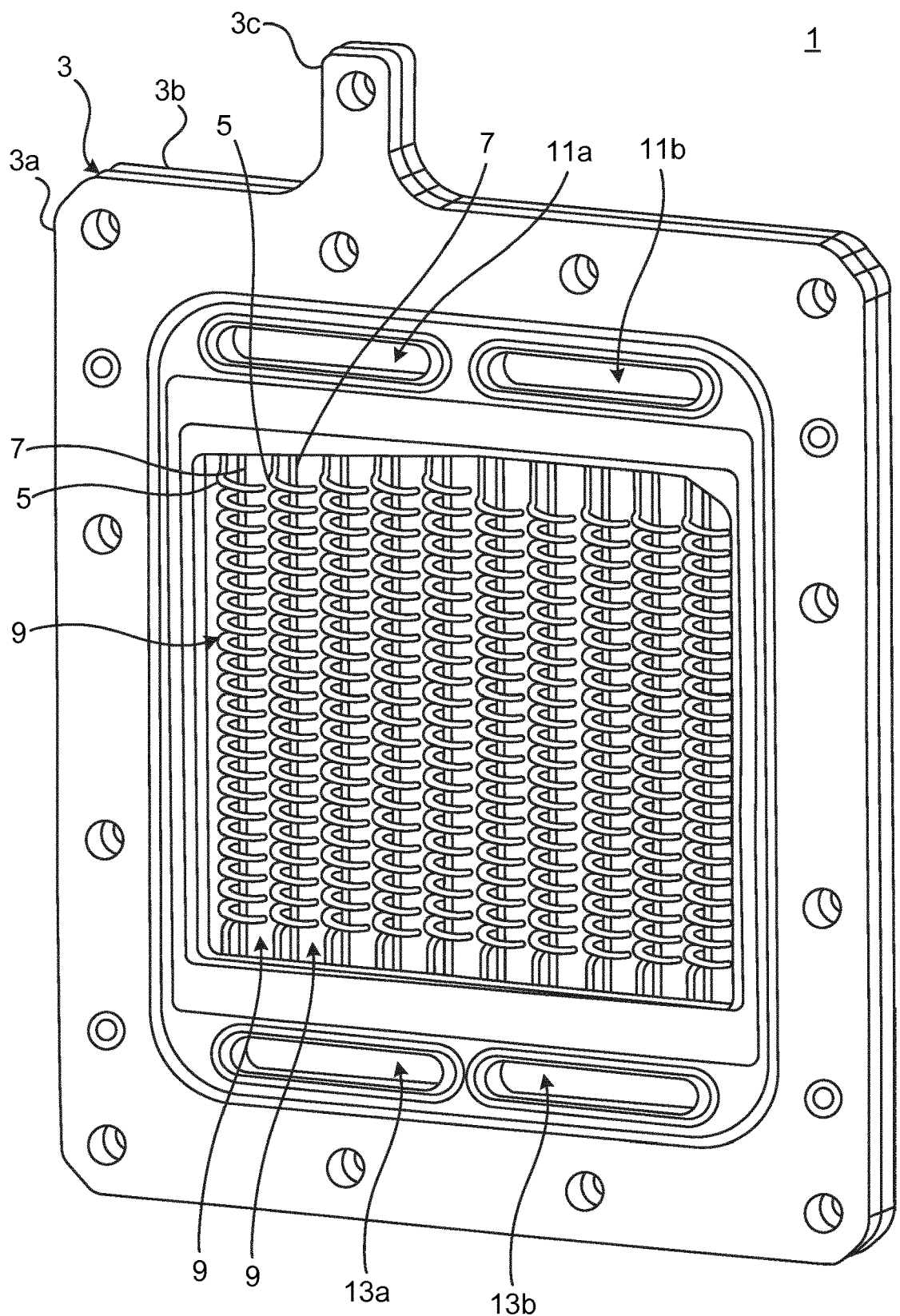
FIG. 1 schematically shows perspective view of an example of an electrode.

FIG. 1 shows an example of an electrode 1. The electrode 1 may be used for an electrolysis process, for example for electrolysis of water. The electrode 1 comprises an electrically conducting frame 3. The electrically conducting frame 3 may for example comprise copper.

In the present example, the electrically conducting frame 3 comprises two frame members 3a and 3b. The two frame members 3a and 3b are configured to be aligned with each other and mounted together to form the electrically conducting frame 3. It is to be noted that the electrically conducting frame 3 could alternatively consist of a single frame member.

The electrode 1 is configured to be connected to a terminal of a power supply. The exemplified electrode 1 comprises a connection portion 3c configured to be connected to a power supply. In particular, the electrically conducting frame 3 comprises the connection portion 3c. The connection portion 3c may for example be a protrusion or tongue extending from the main body of the electrically conducting frame 3, as shown in FIG. 1.

The electrode 1 further comprises a metal coil 5 and a metal wire 7. The metal coil 5 may for example comprise copper. The metal wire 7 may for example comprise copper. The metal wire 7 extends inside the metal coil 5. The metal coil 5 has a plurality of turns forming an elongated coil body. The metal coil 5 extends between two opposite sides of the electrically conducting frame 3. The metal wire 7 extends inside the elongated coil body, in particular in a central channel formed by the turns of the coil, in the axial direction of the metal coil 5.

In the example shown in FIG. 1, the metal wire 7 has a straight or essentially straight longitudinal extension. The metal wire 7 extends from one side of the electrically conducting frame 3 to an opposite side of the electrically conducting frame 3.

The metal coil 5 and the metal wire 7 may be covered with a nanoporous structure comprising nickel.

The exemplified electrode 1 comprises a plurality of pairs of metal coils 5 and metal wires 7. Each pair of metal coil 5 and metal wire 7 will in the following be referred to as a subunit 9. These subunits 9 are arranged inside the electrically conducting frame 3 one after the other. The subunits 9 have a longitudinal extension in a common plane. The subunits 9 are arranged in parallel. The pairs of metal coils 5 and metal wires 7 are hence arranged parallel with each other, extending between opposing sides of the electrically conducting frame 3. The subunits 9 may essentially fill the space between the side portions of the frame. Each subunit 9 may hence extend longitudinally from a first side of the electrically conducting frame 3 to an opposite second side of the electrically conducting frame 3, and the plurality of subunits 9 may be arranged one after the other, in parallel, so that they occupy the space from a third side of the electrically conducting frame 3 to a fourth side of the electrically conducting frame 3, opposite to the third side.

In the present example, the subunits 9 are fixed to the electrically conducting frame 3 between the two frame members 3a and 3b. In particular, each pair of metal coil 5 and metal wire 7 may be clamped between the two frame members 3a and 3b. Other means for attachment of the subunits to the electrically conducting frame are also envisaged. The metal coils and metal wires could for example be attached to the electrically conducting frame by means of screws or other fastening means.

The electrically conducting frame 3 comprises first through-openings 11a-b and at least one second through-opening, in the present example two second through-openings 13a-b, extending through the electrically conducting frame 3 in a direction perpendicular to the longitudinal extension of the subunits 9, i.e. of the metal coils 5 and the metal wires 7. The first through-openings 11a-b are in fluid communication with the subunits 9 at one end of the subunits 9. The second through-openings 13a-b are in fluid communication with the subunits 9 at an opposite end of the subunits 9. The first through-openings 11a-b may for example be gas outlets such as a first gas outlet 11a and a second gas outlet 11b. The second through-opening(s) 13a-b may for example be liquid inlets to allow liquid to submerge the subunits 9. Gas created in the vicinity of the subunits 9 in an electrolysis process due to liquid contact with the subunits 9 provided with an electric potential may exit the electrically conducting frame 3 via the through-openings 11a-b, as will be explained in more detail in what follow.

As an alternative to the example described above, the electrode could be provided without metal wires.

Figure 2:
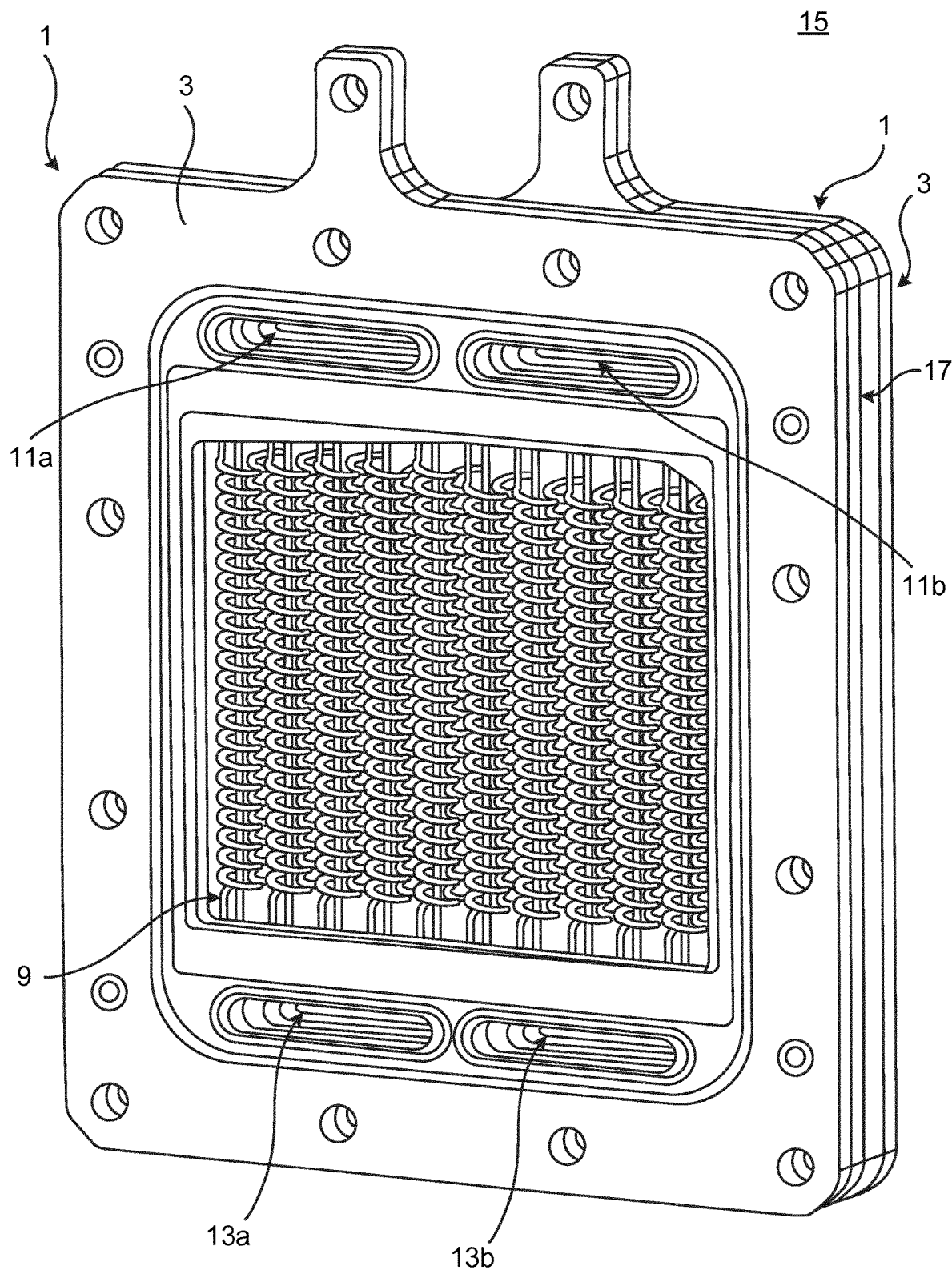
FIG. 2 schematically shows a perspective view of an example of an electrolytic cell.

FIG. 2 shows an example of an electrolytic cell 15. The exemplified electrolytic cell 15 comprises two electrodes 1 arranged in a stacked manner. The first through-openings 11a-b of a first of the electrodes 1 are aligned with the corresponding first through-openings of a second of the electrodes 1 of the electrolytic cell 15.

Figure 3:
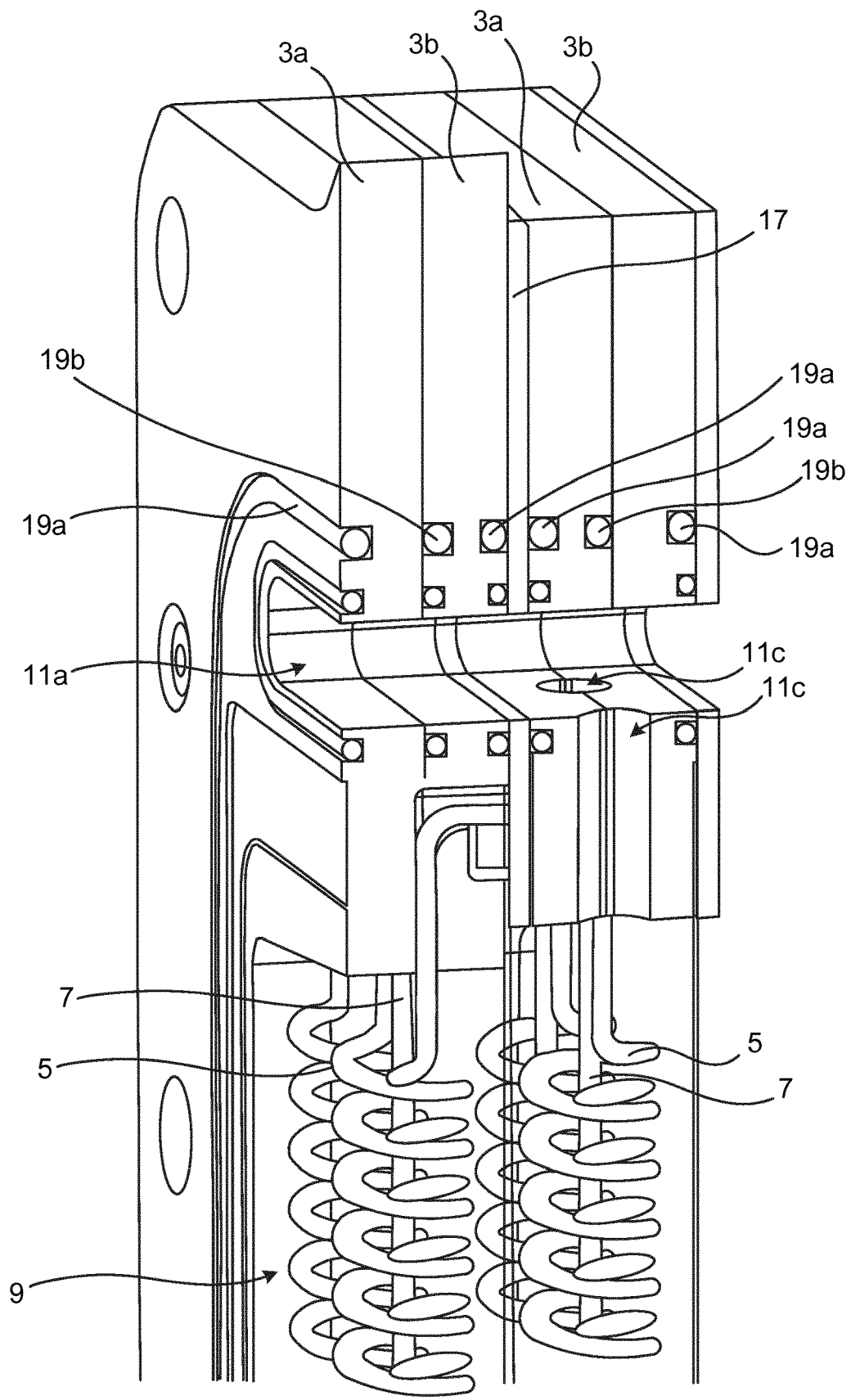
FIG. 3 schematically shows a section through the electrolytic cell shown in FIG. 2.

The second through-openings 13a-b of the first electrode 1 are aligned with the corresponding second through-openings of the second electrode 1 of the electrolytic cell 15. Liquid is thus able to flow through the electrically conducting frames 3 to the subunits 9. Moreover, gas is able to flow from the subunits 9 and through the stacked electrically conducting frames 3 via the first through-openings 11a-b. This configuration is illustrated for the first through-openings 11a of the two electrodes 1 in FIG. 3, which is a section of a to top portion of the electrolytic cell 15 shown in FIG. 2.

The electrolytic cell 15 may comprise a membrane (not shown), such as a separator membrane. The membrane is arranged between the two electrodes 1. In particular, the membrane may be sandwiched between the two electrodes 1.

The electrolytic cell 15 may comprise at least one gasket 17 sandwiched between two adjacent electrodes 1. An elastomer, such as a polymeric elastomer, is typically used for the at least one gasket 17. The gasket material may be electrically insulating. In such case, the gasket 17 is configured to electrically insulate the two adjacent electrodes 1 from each other.

A membrane and one or more gasket(s) 17 may thus jointly separate two adjacent electrodes of an electrolytic cell 15. A membrane and one or more gasket(s) 17 may also jointly separate two adjacent electrolytic cells 15.

The electrolytic cell 15 may also comprise one or more first sealing members 19a such as O-rings to ensure a fluid tight connection between the two electrodes 1. The electrolytic cell 15 may also comprise second sealing members 19b configured to provide a fluid-tight connection between the frame members 3a and 3b of each electrode 1. The second sealing members 19b may for example be O-rings.

It has previously been stated that the first through-openings 11a-b of each electrode 1 are in fluid communication with one end of the corresponding subunits 9. In the example in FIG. 3, an example of this fluid communication is provided. In particular, the electrically conducting frame 3 comprises fluid channels 11c extending from only one of the first through-openings 11a-b to the subunits 9. In particular, only one of the electrodes 1 has fluid-channels 11c connected to the first through-opening 11a and only one of the electrodes 1 has fluid channels connected to the first through-opening 11b. This ensures that two gas flows can be separated from each other, as will be explained below.

The electrically conducting frame 3 may also comprise fluid channels (not shown) for connecting the second through-openings 13a-b with the other end of the subunits 9.

Figure 4:
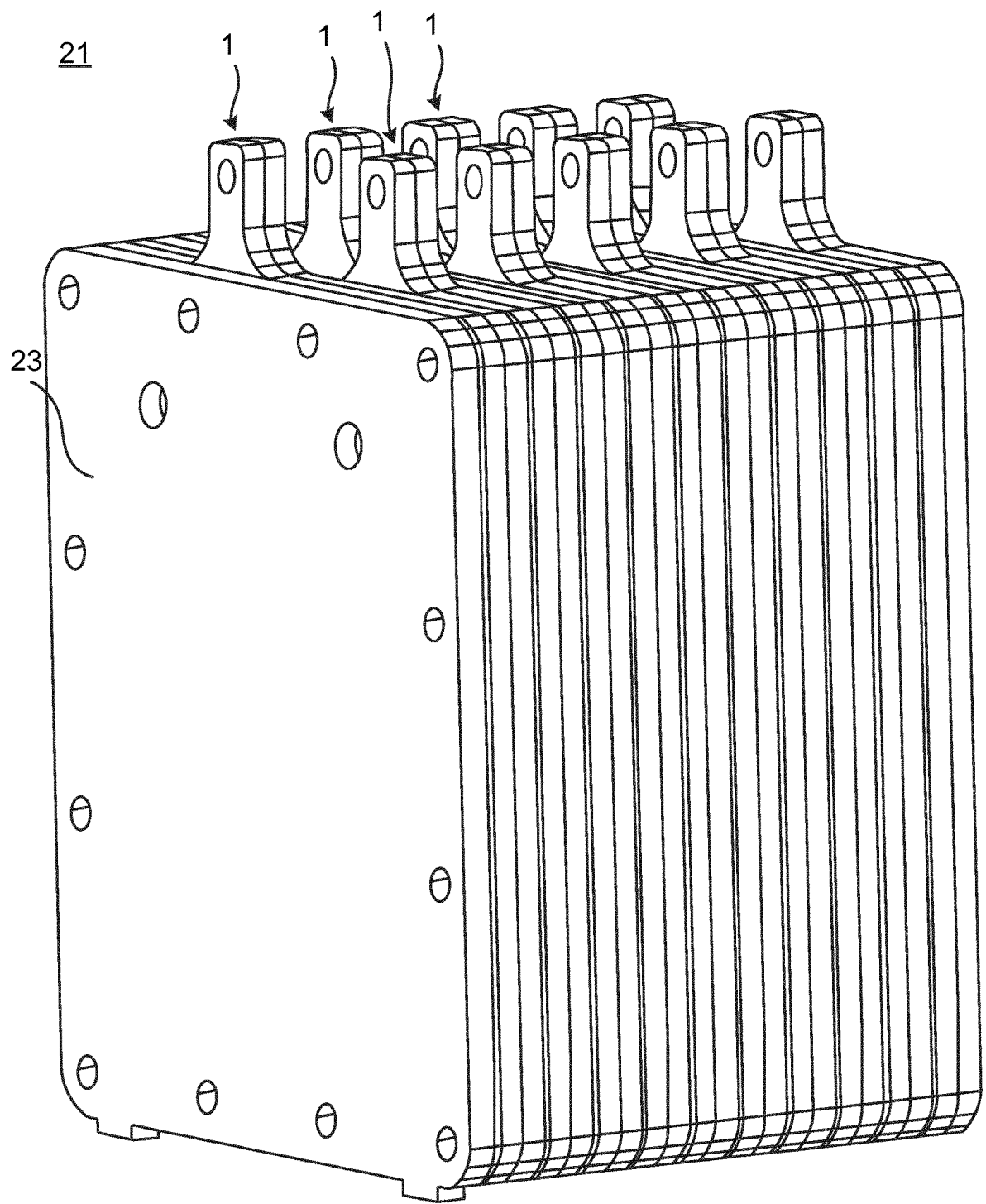
FIG. 4 schematically shows an example of an electrolyser stack comprising a plurality of electrolytic cells shown in FIG. 2.

FIG. 4 shows an electrolyser stack 21. The electrolyser stack 21 comprises a plurality of electrodes 1 arranged one after the other in a stacked manner. In particular, the electrolyser stack 21 comprises a plurality of electrolytic cells 15. Between each pair of adjacent electrodes 1, there is provided at least one gasket 17 and a membrane.

The exemplified electrolyser stack 21 includes a first end plate 23 configured to be mounted to a first outermost electrode 1 and a second end plate (not shown) configured to be mounted to a second outermost electrode 1, at an opposite end of the electrolyser stack 21.

Figure 5:
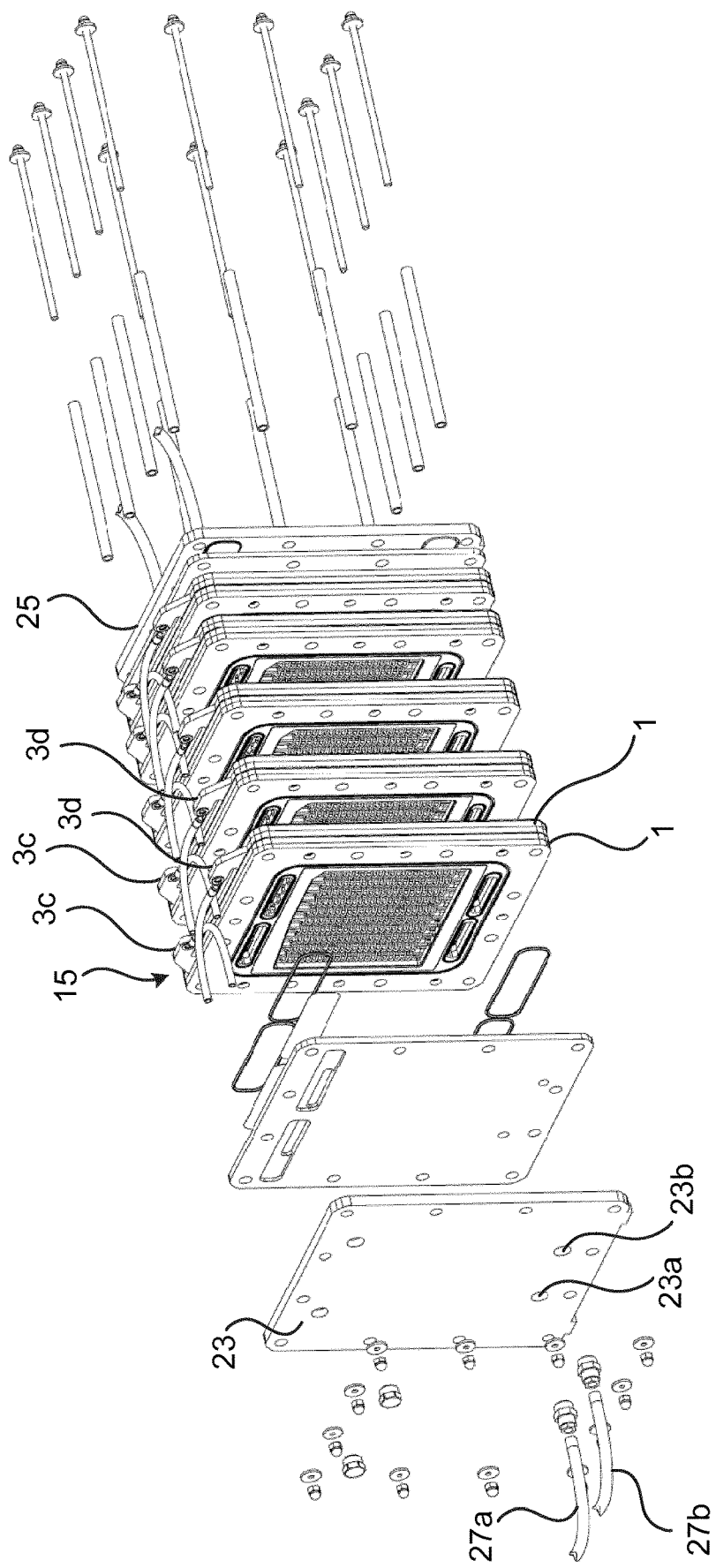
FIG. 5 is an exploded view of an electrolyser stack.

The operation of the electrolyser stack 21 will now be described with reference to FIG. 5, which shows an exploded view of the electrolyser stack 21. In the exploded view, some additional components are also shown. Here, for example, the second end plate 25 is shown. The electrodes 1 are arranged one after the other, forming electrolytic cells 15 in adjacent pairs. Each electrolytic cell 15 has a first connection portion 3c and a second connection portion 3d. Each first connection portion 3c is in electrical connection with a respective electrically conducting frame 3. Each second connection portion 3d is in electrical connection with a respective electrically conducting frame 3. All of the first connection portions 3c are in use connected to a first terminal of a power supply. All of the second connection portions 3d are in use connected to a second terminal of a power supply. Thus the electrodes 1 provided with a first connection portion 3c will in use have a first electric potential and the electrodes provided with a second connection portion 3d will have a second electric potential.

The electrolyser stack 21 is configured to be connected to a liquid supply, typically a water supply. Hereto, the first end plate 23 is provided with fluid inlets 23a and 23b configured to be connected to a liquid supply. The fluid inlets 23a and 23b are connected to a respective one of the second through-openings 13a and 13b. In the example shown in FIG. 5, pipes 27a and 27b can be connected to a respective fluid inlet 23a and 23b.

The second end plate 25 is provided with fluid outlets (not shown). The fluid outlets are configured to be connected to e.g. pipes. A first fluid outlet is configured to be connected to one of the first through-openings 11a and 11b and a second fluid outlet is configured to be connected to the other of the first through-openings 11*a* and 11*b*. Thus, in the present example the first fluid outlet is configured to be connected to the first through-opening 11*a* and the second fluid outlet is configured to be connected to the first through-opening 11*b*. When the electrolyser stack 21 has been installed, the second through-openings 13*a-b* are located closer to the bottom of the electrolyser stack 21 than the first through-openings 11*a-b*. When for example water such as alkaline water enters the electrolyser stack 21 through the first inlet 27*a* and the second inlet 27*b*, the water will flow through the second through-openings 13*a* and 13*b*. As more water flows into the electrolyser stack 21, water is distributed and flows upwards into the fluid channels of the electrically conducting frames 3. From here, the water flows into a fluid chamber, which is formed by the stacked electrolytic cells 15. The fluid chamber is subsequently filled with water which contacts the subunits 9, i.e. the metal coils 5 and the metal wires 7. When the electrodes 1 are fed with current, an electrolysis process is initiated. Thus, hydrogen gas is created at the cathodes and oxygen at the anodes. The hydrogen gas and the oxygen gas, which rise due to lower density than water, will as a result of the alternating fluid channel configuration in the electrodes 1, enter a respective one of the two first through-openings 11*a* and 11*b*, which are located vertically above the subunits 9. The hydrogen gas and the oxygen gas can thus individually be discharged/released from the electrolyser stack 21.

In one example of the electrode presented herein the metal coil 5 may have a coil diameter of 1.2 cm, the winding wire diameter may be 1.7 mm and the gap between turns may be 2.5 mm. It is to be noted that this is merely one example and a great plurality of different dimensions of the metal coil are envisaged.

According to one variation of the present concept, the electrodes may be constructed without the metal wire. Hereto, in such an embodiment, the electrode comprises an electrically conducting frame and at least one metal coil which extends between two opposite sides of the electrically conducting frame. The electrically conducting frame and the metal coil are electrically connected. The metal coil may comprise copper. Typically, the electrode comprises a plurality of metal coils extending parallel with each other from one side to an opposite side of the electrically conducting frame. In this example, an electrolytic cell may be formed by two electrodes of this type. A plurality of electrolytic cells of this type may form an electrolyser stack.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An electrode comprising:
   a metal coil, wherein the metal coil comprises a metal selected from copper, silver, gold, nickel and aluminum, wherein turns of the metal coil are separated by a gap; and
   a metal wire, wherein at least part of the metal wire is arranged inside the metal coil and wherein the metal wire and the metal coil are in electrical contact,
   wherein the metal wire comprises a metal selected from copper, silver, gold, nickel and aluminum,
   wherein the metal wire and the metal coil are made of a same metal,
   wherein the metal coil has a plurality of turns forming an elongated coil body with an open central channel along a central axis of the metal coil,
   wherein the metal wire extends longitudinally inside the open central channel from one end of the metal coil to an other end of the metal coil along the central axis of the metal coil,
   wherein the plurality of turns of the metal coil are separated from the at least part of the metal wire arranged inside the metal coil by at least a portion of the open central channel, and
   wherein the metal wire and the metal coil are covered with a nanoporous structure comprising nickel.

2. The electrode of claim 1, wherein the metal wire extends straight or essentially straight inside the open central channel from the one end of the metal coil to the other end of the metal coil.

3. The electrode of claim 1, wherein the metal wire and the metal coil are galvanically connected.

4. An electrolytic cell comprising two of the electrode according to claim 1 and a membrane configured to separate the two of the electrode.

5. An electrolyser stack comprising at least two of the electrolytic cell according to claim 4.

6. An electrode comprising:
   a metal coil, wherein the metal coil comprises a metal selected from copper, silver, gold, nickel and aluminum, wherein turns of the metal coil are separated by a gap;
   a metal wire, wherein at least part of the metal wire is arranged inside the metal coil and wherein the metal wire and the metal coil are in electrical contact; and
   an electrically conducting frame to which the metal wire and the metal coil are connected,
   wherein the metal wire comprises a metal selected from copper, silver, gold, nickel and aluminum,
   wherein the metal wire and the metal coil are made of a same metal,
   wherein the metal coil has a plurality of turns forming an elongated coil body with an open central channel along a central axis of the metal coil,
   wherein the metal wire extends longitudinally inside the open central channel from one end of the metal coil to an other end of the metal coil along the central axis of the metal coil, and
   wherein the plurality of turns of the metal coil are separated from the at least part of the metal wire arranged inside the metal coil by at least a portion of the open central channel.

7. The electrode of claim 6, wherein the electrically conducting frame is a metal frame.

8. The electrode of claim 6, wherein the electrically conducting frame comprises copper.

9. The electrode of claim 6, wherein the electrically conducting frame is covered with an insulating material.

10. An electrode comprising:
   a metal coil, wherein the metal coil comprises a metal selected from copper, silver, gold, nickel and aluminum, wherein turns of the metal coil are separated by a gap; and
   a metal wire, wherein at least part of the metal wire is arranged inside the metal coil and wherein the metal wire and the metal coil are in electrical contact,
   wherein the metal wire comprises a metal selected from copper, silver, gold, nickel and aluminum,
   wherein the metal wire and the metal coil are made of a same metal, wherein the metal coil has a plurality of turns forming an elongated coil body with an open central channel along a central axis of the metal coil, wherein the metal wire extends longitudinally inside the open central channel from one end of the metal coil to an other end of the metal coil along the central axis of the metal coil, wherein the plurality of turns of the metal coil are separated from the at least part of the metal wire arranged inside the metal coil by at least a portion of the open central channel, and wherein the metal wire and the metal coil forms a subunit and the electrode comprises at least two such subunits.

11. The electrode of claim 10, comprising an electrically conducting frame to which the metal wire and the metal coil are connected, and wherein the at least two subunits are connected to the electrically conducting frame.

12. The electrode of claim 10, wherein the at least two subunits extend longitudinally in a same plane.

13. The electrode of claim 10, wherein the at least two subunits are parallel.

* * * * *